(12) United States Patent
Good et al.

(10) Patent No.: US 10,466,412 B1
(45) Date of Patent: Nov. 5, 2019

(54) SELECTIVE MODE SUPPRESSING MULTI-MODE FIBER OPTIC CABLE FOR INCREASED BANDWIDTH

(71) Applicant: NEXANS, Courbevoie (FR)

(72) Inventors: Paul Michael Good, New Holland, PA (US); Rakesh Sambaraju, Downingtown, PA (US)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/119,233

(22) Filed: Aug. 31, 2018

(51) Int. Cl.
*G02B 6/02* (2006.01)

(52) U.S. Cl.
CPC ................ *G02B 6/02395* (2013.01)

(58) Field of Classification Search
CPC .............. G02B 6/02395; G02B 6/0288; G02B 6/02023; G02B 6/02285; G02B 2006/1209; G02B 6/126; G02B 6/14; G02B 6/268; G02B 6/278; G02B 6/29392
See application file for complete search history.

(56) References Cited

U.S. PATENT DOCUMENTS

2010/0303404 A1* 12/2010 Fischer .................. G01B 11/18
385/13

* cited by examiner

*Primary Examiner* — John Bedtelyon
(74) *Attorney, Agent, or Firm* — Sofer & Haroun, LLP

(57) ABSTRACT

A multi-mode optical fiber includes a glass center for conducting fundamental and high order modes of light waves, the high order modes including a first desired group of high order modes and a second undesired group of high order modes. A cladding surrounds the glass center, the glass center and cladding forming a core. A trench within the cladding surrounds the glass center reflecting the first and second groups of high order modes into the core. An acrylic layer surrounds the core. A buffer coating of polymer surrounds the acrylic layer and the core. The buffer coating is a pressure extruded polymer, where the buffer coating retains at least some of the pressure from the pressure extrusion and applies continuous pressure to the acrylic layer and the core therein, along the length of the fiber, such that the at least the first group of desired high order modes are permitted to be transmitted through the core and where the second group of undesired high order modes are suppressed.

6 Claims, 8 Drawing Sheets

SELECTIVE MODE SUPPRESSING MULTI-MODE FIBER OPTIC CABLE FOR INCREASED BANDWIDTH

BACKGROUND

Field of the Invention

This application relates to fiber optic cables. More particularly, this application relates to fiber optic cable that suppresses higher order modes from the fiber cladding.

Description of Related Art

The basic construction of an optical fiber includes a drawn glass core with a cladding disposed thereover. The light signal is injected into an end face of the fiber, typically at an optical transceiver to which the fiber is connected. The injected light is guided down the core of the fiber by the optical cladding having a lower refractive index than the core, trapping the injected light within the core through total internal reflection. There are two primary ways to manage the transition of refractive index between the core glass and the cladding, namely step indexed (fast transition in refractive index between the core and cladding) and graded index (gradual transition from high to low refractive index from the core out towards the cladding).

Prior art FIG. 1 shows a basic image of prior art fiber optic cable. For the purpose of illustration, the optical fiber (core/cladding) is shown within an inner core coating, surround by a strength component, and then surrounded again by an outer jacket.

Using this basic construction, there are two primary types of fibers commonly used in the industry, single-mode (SMF) and multi-mode fibers (MMF). Single mode fibers typically have a smaller core that can support only one mode (or ray) of light to propagate. These single mode fibers are typically used for longer spans as they are less susceptible to attenuation and modal dispersion, but the transceivers used in these systems are more expensive. Multimode fibers typically have larger cores, are more susceptible to attenuation and modal dispersion but the transceivers are more cost effective. In multimode fibers different modes of light travel via different paths within the fiber, which results in light reaching the end at slightly different times due to path length differences. This effectively disperses the signal coming out of the other end.

One issue regarding light propagation that occurs in fibers, particularly in multi-mode fibers, is attenuation resulting from bending. As a fiber bends beyond a certain radius, light passing down the core of the fiber begin to escape the cladding layer causing unwanted light loss and signal attenuation. A solution to this is "bend insensitive" (BI) fiber which makes use of an optical "trench" which is formed by a thin ring of lower index of refraction material that reflects the lost light back into the core of the fiber. FIG. 2 shows a prior art multi-mode fiber and a BI multi-mode fiber with the low index ring in the cladding close to the core.

However, bend insensitive BI fibers, by nature, allow the propagation of higher order modes in the optical fiber. Fundamental modes in the multimode fiber tend to pass along the length of the fiber near the center of the core. High order modes are the modes that have a relatively highly transverse path taken through the core. As noted above in FIG. 2 some high-order modes can be so transverse as to be less than the critical angle and, therefore, penetrate the interface between the core and cladding and be attenuated or even permanently lost in the cladding layer. However as also shown in the bottom of FIG. 2, the BI construction of the MMF protects these high order modes even under certain degrees of bend induced stress.

Although these features of BI-MMF are generally desirable as it increases the number of functional modes available, the full propagation of all of these higher order modes results in even some unusable/undesirable very high order modes being propagated along with the fundamental modes and desirable higher order modes.

For example, an excess of less desirable very high order modes results in too high of a differential group delay which reduces the overall channel bandwidth. Differential group delay refers to the difference in time between the arrivals of the various modes at the far end of the fiber path in each light pulse, owing to the different shapes/paths of the mode within the core. With more of the high order modes (having greater transverse pathways in the core and thus longer propagation times) being effectively retained in the core the differential group delay per pulse is likewise increased. In some cases with the very high order modes this is considered undesirable because the relatively weaker very high order modes and theft potential value cause so much differential group delay owing to theft highly transverse path that the increased required pulse spacing actually lowers the effective bandwidth.

Generally speaking in the fiber industry, looking for example at the progression of data centers, more and more capacity is being squeezed in optical fibers which will require higher bandwidth (such as the BI-MMF fibers described above). The optical power budget and the power penalty limits that are allowable in fibers used in these arrangements are set by standards committees such as those in the Institute for Electrical and Electronic Engineers (IEEE). As the speed of the data center networking connectivity increases, the reach is shrinking for multi-mode fibers, due to the bandwidth constrains of the fibers. For e.g., a 10 G multi-mode fiber link had a maximum reach of 400 m, whereas a 100 G link on the same fiber has a maximum reach of 100 m.

With this increase in desired bandwidth capacity, making use of the higher order modes available in BI-MMF, the power penalty due to system impairments like modal dispersion have a greater impact than the optical insertion loss penalty (insertion loss is a different form of signal attenuation caused by physical defects in the fiber as well as splices, connector junctions etc. . . . ). This makes using BI MMF less attractive, because as the speeds increase, the system tolerance to modal dispersion decreases.

Existing solutions to these two problems related to BI MMF as outlined above rely on increasingly tighter specifications for fiber channel insertion loss budgets, and minimum bandwidth requirements. These specifications thus put an upper limit on the total length of the fiber channel that can be deployed using BI-MMF because there is only so much insertion loss that can be avoided even in perfectly constructed fiber channels.

OBJECTS AND SUMMARY

The present arrangement looks to overcome the drawbacks associated with the prior art BI-MMF and proposes a manner for suppressing the unwanted very high modes. This allows for the use of BI-MMF over longer fiber channels by allowing a few higher order modes, but suppressing the unwanted very high order slow traveling modes and thus limiting the differential group delay.

To this end a multi-mode optical fiber includes a glass center for conducting fundamental and high order modes of light waves, the high order modes including a first desired group of high order modes and a second undesired group of high order modes. A cladding surrounds the glass center, the glass center and cladding forming a core. A trench within the cladding surrounds the glass center reflecting the first and second groups of high order modes into the core. An acrylic layer surrounds the core. A buffer coating of polymer surrounds the acrylic layer and the core. The buffer coating is a pressure extruded polymer, where the buffer coating retains at least some of the pressure from the pressure extrusion and applies continuous pressure to the acrylic layer and the core therein, along the length of the fiber, such that the at least the first group of desired high order modes are permitted to be transmitted through the core and where the second group of undesired high order modes are suppressed.

BRIEF DESCRIPTION OF THE DRAWINGS

The present invention can be best understood through the following description and accompanying drawing, wherein.

DETAILED DESCRIPTION

Figure 1:
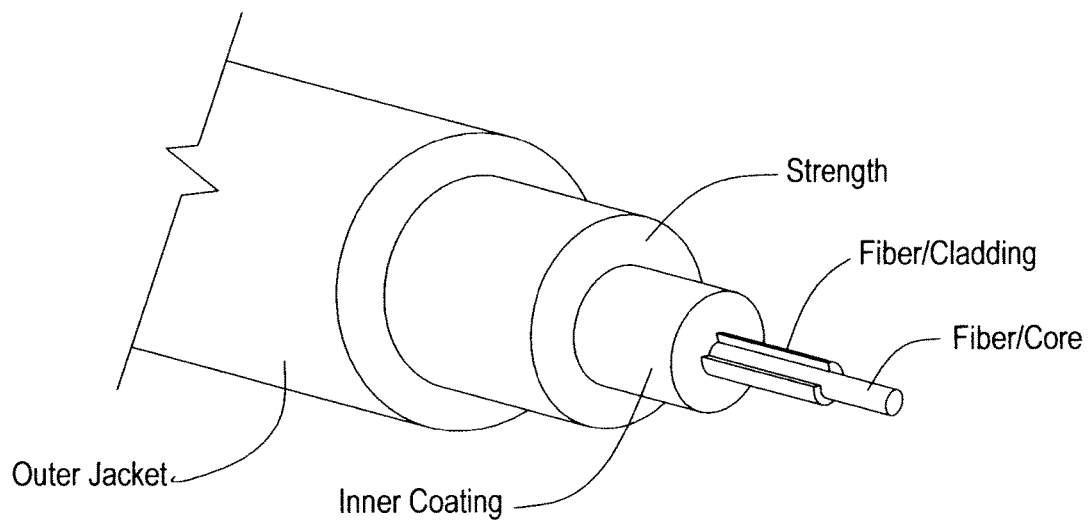
FIG. 1 is a prior art arrangement for a basic optical fiber.
Figure 2:
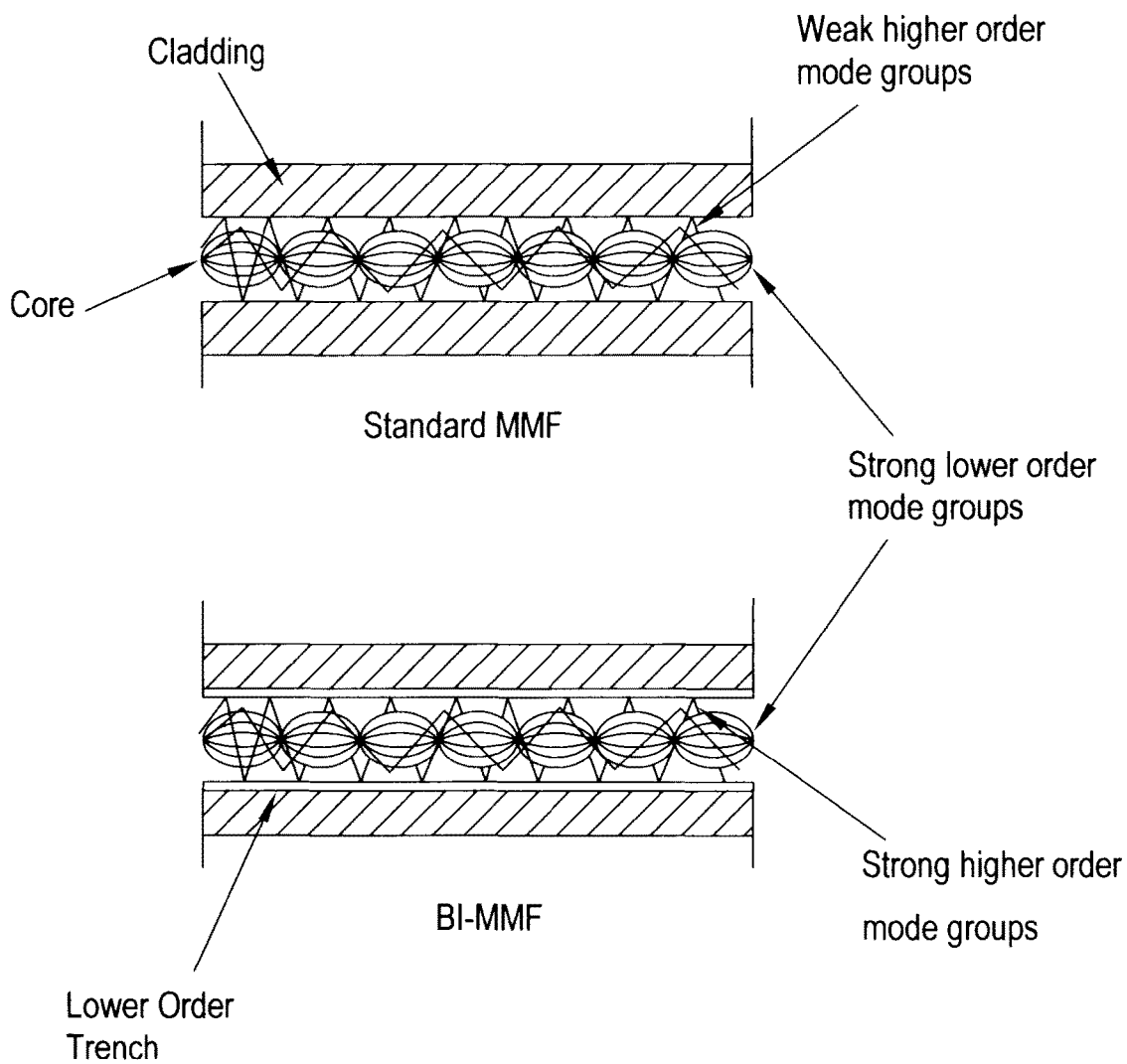
FIG. 2 is a prior art arrangement for multi-mode fibers and bend insensitive multi-mode fibers.
Figure 3:
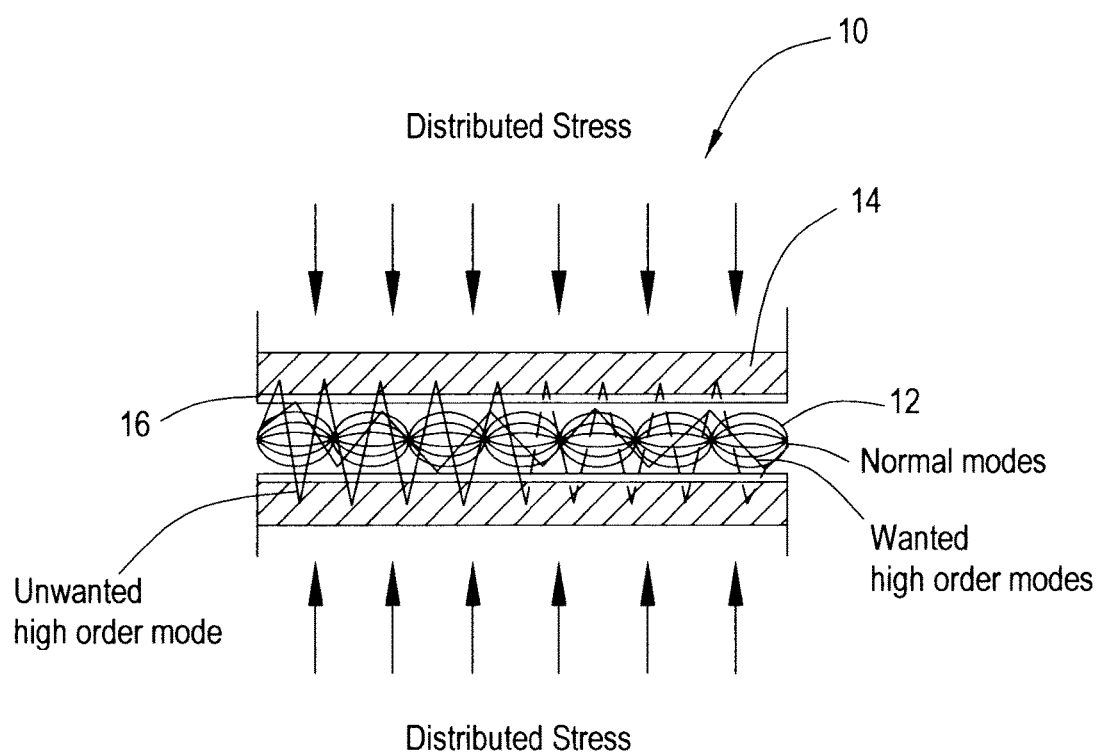
FIG. 3 is a bend insensitive optical fiber according to one embodiment.

In one embodiment of the present arrangement as shown in FIG. 3, an optical fiber 10 is constructed having, among other elements, a center glass 12 and cladding 14 (commonly referred to as the core). Within cladding 14 is a trench 16 of low refractive index causing higher order modes propagating through center glass 12 to be reflected back into the core rather than escaping through cladding 14 making fiber 10 "bend insensitive." The inner coating, strength member(s) and outer jacket of the fiber are not shown so as to provide clarity to the figure but it is understood that such elements would be present in the final optical fiber produced according to this application.

As shown in FIG. 3, when distributed stress is applied on optical fiber 10, the unwanted higher order leaky modes disappear into cladding 14 over fiber core glass 12 in a distributed fashion. This may be caused for example of a change in the material properties of the fiber such that the higher order modes either decouple (into leaky modes, escaping into cladding), or they otherwise escape the cladding, failing the TIR (Total Internal Reflection) angles. The amount of pressure or length of the fiber required to be put under pressure will vary depending on the amount of high order mode suppression required and also on the types of material that the fiber core is constructed from.

Figure 4:
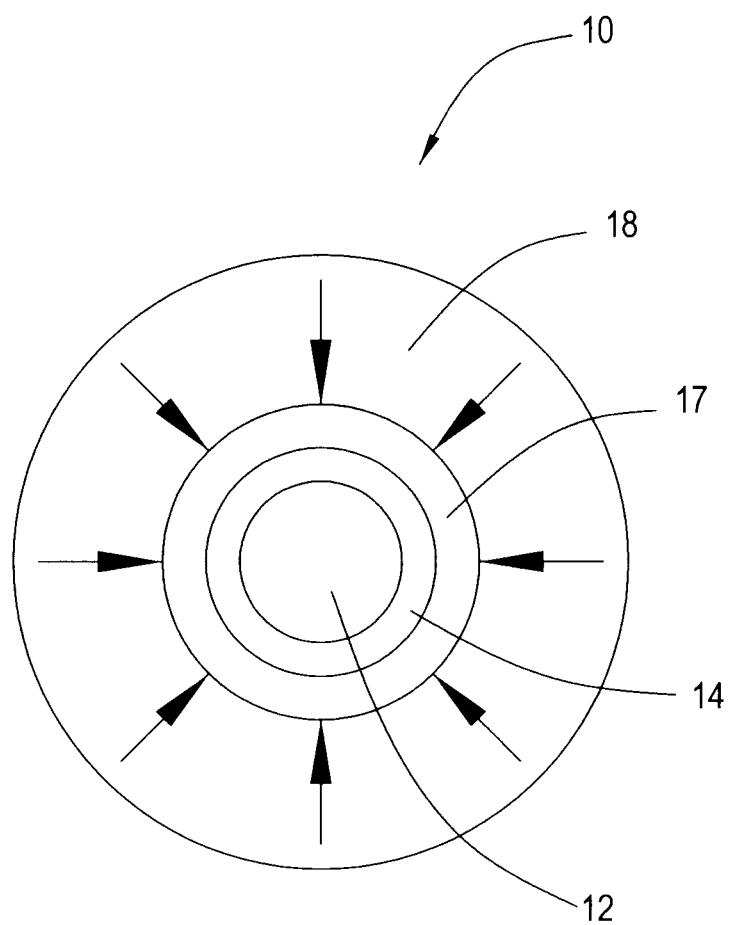
FIG. 4 is an optical fiber of FIG. 3 in a tight buffer arrangement.

In one arrangement as illustrated in FIG. 4 one manner for applying distributed stress on the fiber is to provide a pressure extruded buffer layers with enough latent pressure on the contents below the buffer layer to achieve the desired effect. One type of fiber optic cable 10 is a tight buffer cable which includes the same basic components of the center core 12 and cladding 14 with a normal acrylic coating 17, usually colored for identification (or sometimes clear/white). Around the core a tightly applied buffer 18, usually PVC at about 900 µm diameter, is applied for external protection. This tight buffer 18 in the present arrangement may be applied through pressure extrusion which extrudes the polymer buffer 18 under heat and pressure onto acrylic coating 17. However, instead of being applied under normal pressure extrusion conditions, added pressure may be applied during extrusion to apply an "extra" tight buffer 18, provided it is within the pressure/mechanical tolerances of the core. Such an arrangement as shown in FIG. 4 would apply the distributed stress as explained in connection with FIG. 3.

Figure 5:
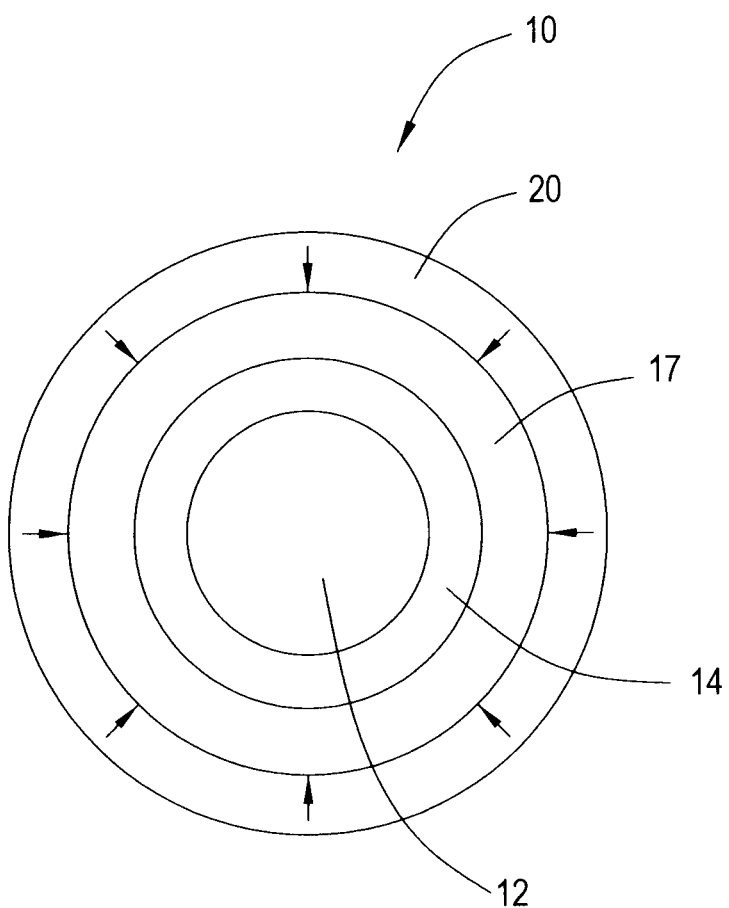
FIG. 5 is an optical fiber of FIG. 3 in a loose tube arrangement.

In another embodiment a similar type of distributed stress may be applied to a loose tube type fiber. Loose tube type fibers are similar to tight buffer fibers with an inner glass 12, cladding 14 (together the core), and an acrylic coating 17, but without buffer 18. These types of fibers are usually used in groups and contained in "loose" tube or jacket containing for example twelve or twenty four (12/24) fibers. As shown in FIG. 5, in the present example, instead of a buffer tube 18, each loose tube fiber 10 could instead be surrounded by a "very" tight jacketing or polymer cover 20, significantly less thick than the typical 900 µm buffer but still pressure extruded at a significant enough pressure to apply latent distributed stress as explained above.

Figure 6:
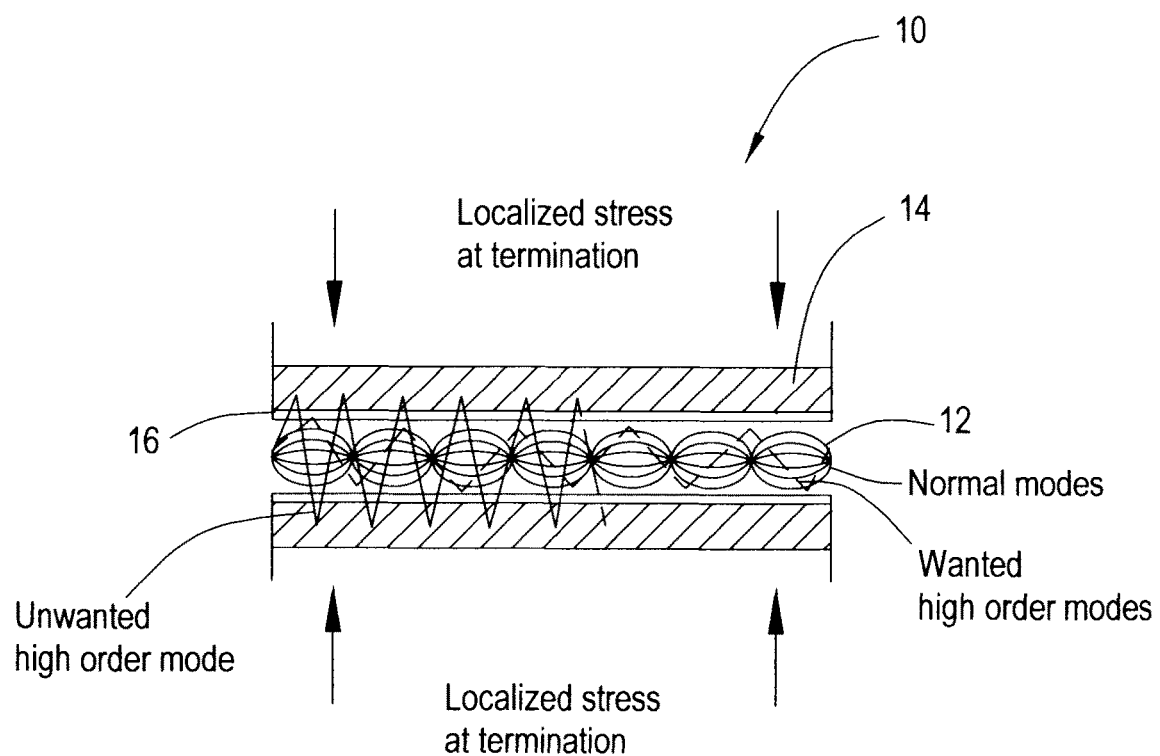
FIG. 6 is a bend insensitive optical fiber according to another embodiment.

In another embodiment as shown in FIG. 6, instead of fiber 10 being subject to distributed pressure along its length, it is instead subject to localized pressure near the two ends of fiber 10. As with the embodiment above, by applying localized pressure at the ends of fiber 10 the higher order leaky modes disappear into cladding 14 being "stripped" near the connector termination points.

Figure 7:
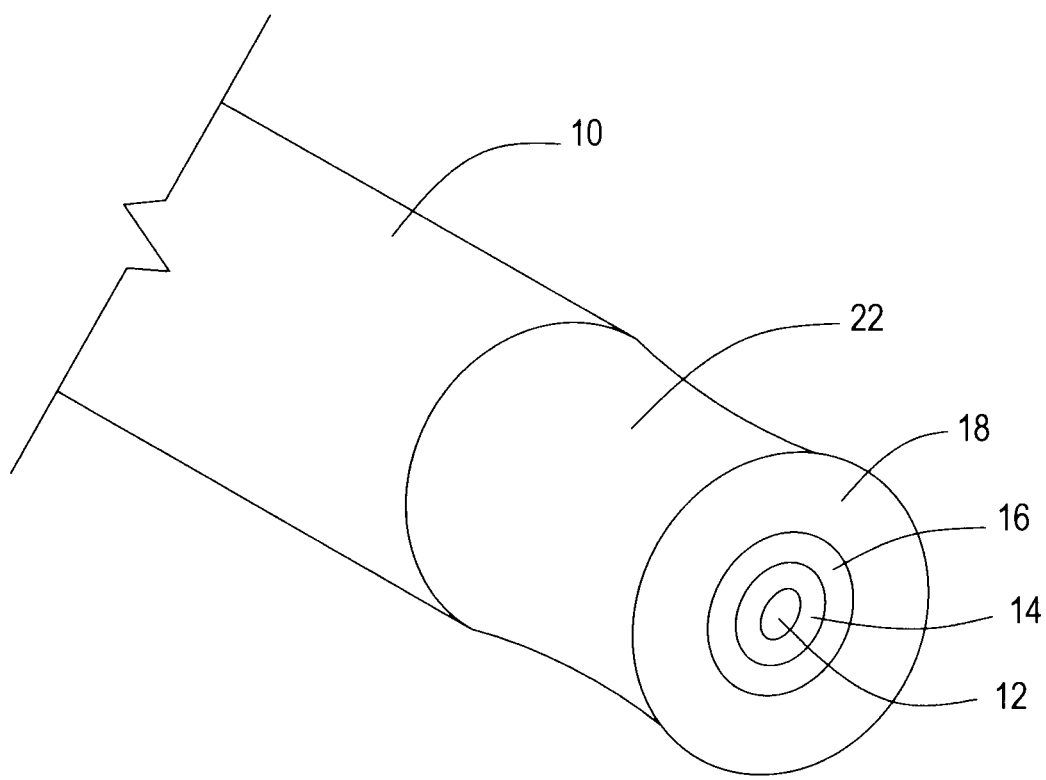
FIG. 7 is an optical fiber of FIG. 3 in a tight buffer arrangement.
Figure 8:
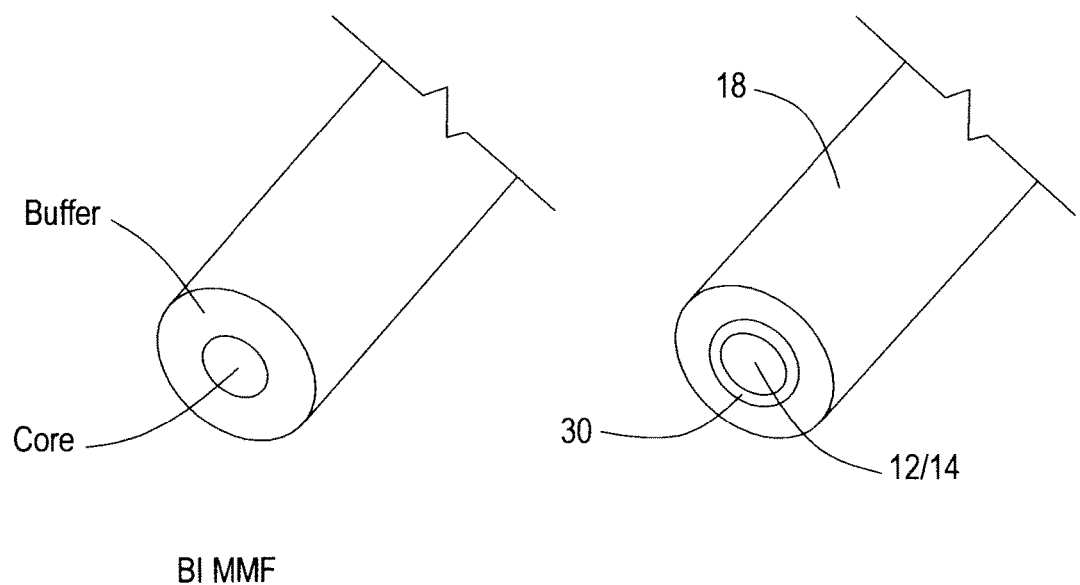
FIG. 8 shows an additional embodiment with a polished core according to another embodiment.

In one arrangement, as shown in FIG. 7 an example of a localized pressure is applied to a tight buffered fiber 10, as described above, using a ring or pressure clamp 22. Such clamp 22 may be applied to an ordinary tight buffer fiber or to the enhanced pressure tight buffer fiber 10 as described above in FIG. 4. Moreover, clamp 22 may be a standalone clamp applied once on fiber 10 or several may be used, such as one at both ends, possibly with additional clamps 22 in the midspan of cable 10. Assuming clamp(s) 22 are arranged at the ends of fiber 10, they may optionally be retained within the connector (not shown). An exemplary clamp 22 for localized pressure may for example may be about 0.25" wide (to fit inside the rear of a connector) but it can be of other widths as needed, and it also may or may not be of adjustable pressure/diameter.

In another embodiment of the present arrangement, in addition to the abovementioned structures for removing unwanted high order modes in BI MMF using localized or distributed pressure, another way to reduce unwanted high order modes in BI MMF is to filter or block such higher order modes by deliberately creating imperfect polishing of core 12/14 in a way that the light travelling near the outer circumference of core 12/14 gets heavily attenuated. For example, as shown in FIG. 5, center glass 12 of fiber 10 has an imperfectly polished end 30 (corresponding to the border between core 12/14 and coating 16 and, for example, tight buffer 18) as compared to a typically BI-MMF. In this arrangement the unwanted very high order modes are filtered by blocking the optical modes travelling at the outer parts of center glass 12 allowing only the desired fundamental and otherwise desired higher order modes.

Such imperfect polishing 30 can be generated by deliberately creating imperfect polishing. In normal MMF cable processing, the ends of fiber 10 are finely polished before terminating it with the connector.

In this process, inner glass 12 and cladding 14 (core) can both be polished in a way that the light travelling near the circumference of the core 12/14 gets heavily attenuated blocking such high order modes. This could be accomplished for example as a second polishing step, performed after a normal polishing process. By applying a substance of approximately equal thickness across the end face of the fiber (glass 12 and cladding 14) and then polishing it on a device whose diameter is less than that of the core (glass 12 and cladding 14), a thin ring of material will remain around the outside of the fiber. This material 30 will block the light in that area. The material could be chosen to either reflect the light or absorb it. The polishing motion could either be linear with periodic rotations of either the fiber or polish surface while disengaged from the fiber or a rotating polishing head.

In another arrangement, a reduction of core's cross sectional area 30 can be achieved by vapor deposition of metal at the ends of fiber 10 prior to terminating. The vapor deposition can be applied by using a mask on glass/cladding core 12/14 to control the blocking area 30. Such a method may include selectively removing any deposited material during the polishing process, similar to that described above. This could be achieved by carefully controlling the geometry of the end face of fiber 10 and/or the polishing surface.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A multi-mode optical fiber comprising:
   a glass center for conducting fundamental and high order modes of light waves, said high order modes including a first desired group of high order modes and a second undesired group of high order modes;
   a cladding surrounding the glass center, the glass center and cladding forming a core;
   a trench within said cladding surrounding the glass center reflecting said first and second groups of high order modes into said core;
   an acrylic layer surrounding said core; and
   a buffer coating of polymer surrounding said acrylic layer and said core, wherein said buffer coating is a pressure extruded polymer, wherein said buffer coating retains at least some of said pressure from said pressure extrusion and applies continuous pressure to said acrylic layer and said core therein, along the length of said fiber, such that said at least said first group of desired high order modes are permitted to be transmitted through said core and where said second group of undesired high order modes are suppressed.

2. The multi-mode optical fiber as claimed in claim 1, wherein said buffer coating is a tight buffer optical fiber coating for providing environmental protection for said acrylic layer and said fiber core.

3. The multi-mode optical fiber as claimed in claim 1, wherein said buffer coating is a micro coating optical fiber coating for directly forming on said acrylic layer, said fiber and micro coating buffer coating are contained within a loose tube polymer jacket.

4. A multi-mode optical fiber comprising:
   a glass center for conducting fundamental and high order modes of light waves, said high order modes including a first desired group of high order modes and a second undesired group of high order modes;
   a cladding surrounding the glass center, the glass center and cladding forming a core;
   a trench within said cladding surrounding the glass center reflecting said first and second groups of high order modes into said core;
   an acrylic layer surrounding said core;
   a buffer coating of polymer surrounding said acrylic layer and said core; and
   a clamp element, configured to surround said buffer coating in a manner compressing said buffer coating causing pressure on said acrylic layer and said fiber core thereunder, such that said at least said first group of desired high order modes are permitted to be transmitted through said core and where said second group of undesired high order modes are suppressed.

5. The multi-mode optical fiber as claimed in claim 4, wherein said clamp element is at an end of said fiber within a connector element.

6. The multi-mode optical fiber as claimed in claim 5, further comprising a second clamp element where said second clamp element is at a second end said fiber within a second connector element.

* * * * *